United States Patent
Hunt et al.

(10) Patent No.: US 7,128,879 B1
(45) Date of Patent: Oct. 31, 2006

(54) CHEMICAL GENERATOR USING HYDRO-LOGIC SYSTEM

(75) Inventors: William C. Hunt, Norman, OK (US); Neeraj Khanna, Norman, OK (US)

(73) Assignee: Bio-Cide International, Inc., Norman, OK (US)

( * ) Notice: Subject to any disclaimer, the term of this patent is extended or adjusted under 35 U.S.C. 154(b) by 1076 days.

(21) Appl. No.: 09/607,225

(22) Filed: Jun. 30, 2000

Related U.S. Application Data

(60) Provisional application No. 60/187,898, filed on Mar. 8, 2000.

(51) Int. Cl.
*B32B 5/02* (2006.01)
*B01J 10/00* (2006.01)

(52) U.S. Cl. .................. 422/106; 422/129; 422/187; 422/305

(58) Field of Classification Search ............... 422/187, 422/129, 305, 106
See application file for complete search history.

(56) References Cited

U.S. PATENT DOCUMENTS

| | | | |
|---|---|---|---|
| 3,816,077 A | | 6/1974 | Fuller et al. |
| 4,013,761 A | | 3/1977 | Ward et al. |
| 4,143,115 A | * | 3/1979 | Ward et al. ............ 422/113 |
| 4,229,272 A | * | 10/1980 | Yates ................. 205/620 |
| 4,250,126 A | * | 2/1981 | Yates .................. 261/70 |
| 4,329,215 A | * | 5/1982 | Scoville ............. 204/228.2 |
| 4,472,256 A | * | 9/1984 | Hilbig ................ 204/266 |
| 4,724,059 A | * | 2/1988 | Collier ............. 204/228.2 |
| 4,839,152 A | | 6/1989 | Vella et al. |
| 4,886,653 A | * | 12/1989 | Gasper et al. ........ 423/478 |
| 6,790,427 B1 | * | 9/2004 | Charles et al. ....... 423/478 |
| 2002/0021990 A1 | * | 2/2002 | Cowley et al. ........ 422/187 |
| 2002/0061263 A1 | * | 5/2002 | Taylor ............... 422/129 |
| 2003/0229422 A1 | * | 12/2003 | Martens et al. ....... 422/105 |
| 2005/0079124 A1 | * | 4/2005 | Sanderson ............ 423/477 |

* cited by examiner

*Primary Examiner*—Nina Bhat
(74) *Attorney, Agent, or Firm*—Crowe and Dunlevy, P.C.

(57) ABSTRACT

A chemical generator having inlets for receiving multiple reactant and water streams; a dilution chamber; a reaction chamber operably connected to the inlets and to the dilution chamber; an eductor operably receiving the water stream from the one of the inlets and communicating with the reaction chamber for drawing first and second reactant streams into the reaction chamber for mixing. Float control valves interrupt the water stream to the eductor when desired amounts of the first and second reactant streams have entered the reaction chamber, the eductor drawing the activated solution of first and second reactant streams from the reaction chamber into the dilution chamber. The float control valves limit the residence time of the first and second reactants in the reaction chamber and selectively interrupt flow of the water stream into the dilution chamber.

5 Claims, 10 Drawing Sheets

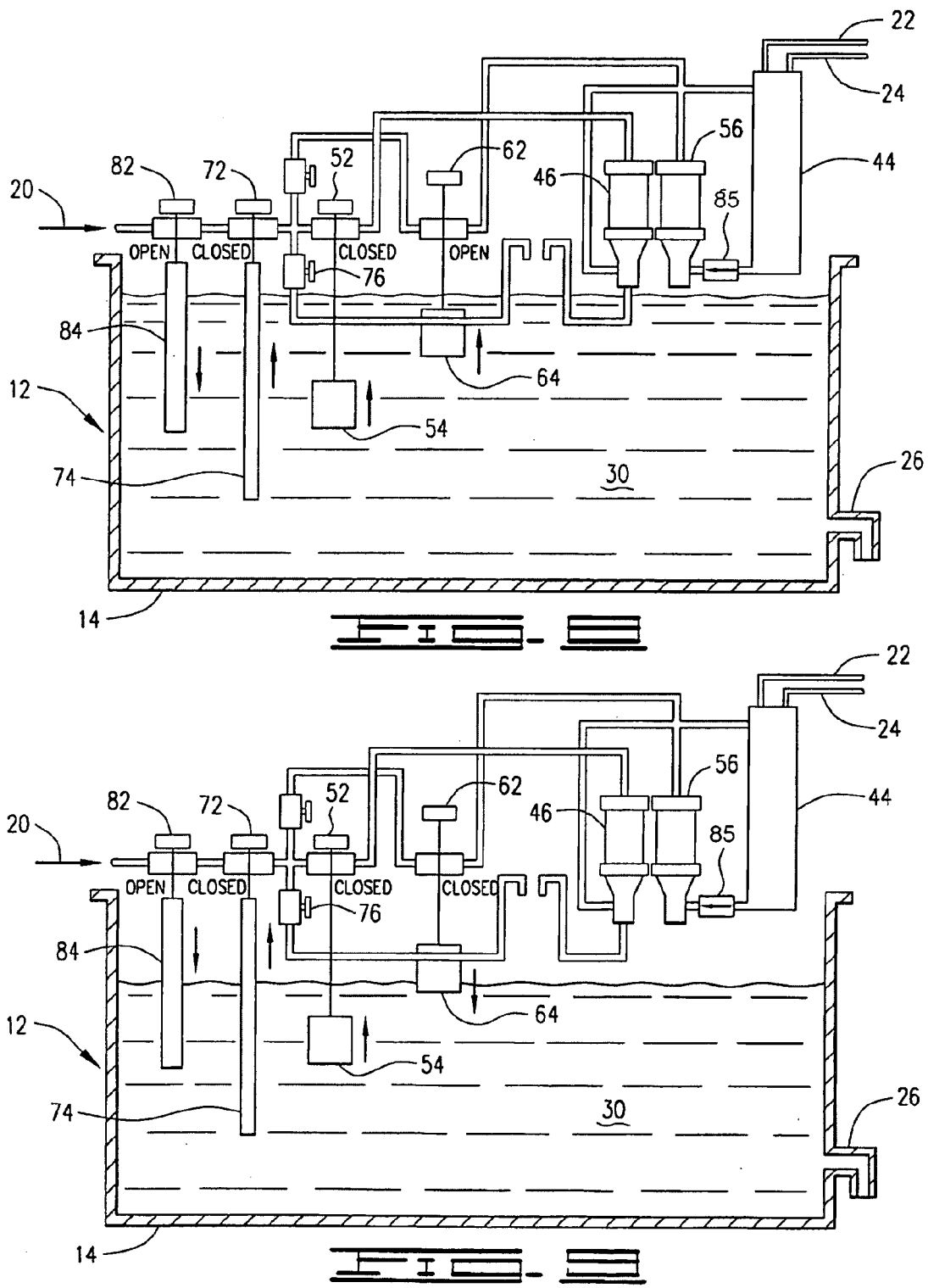

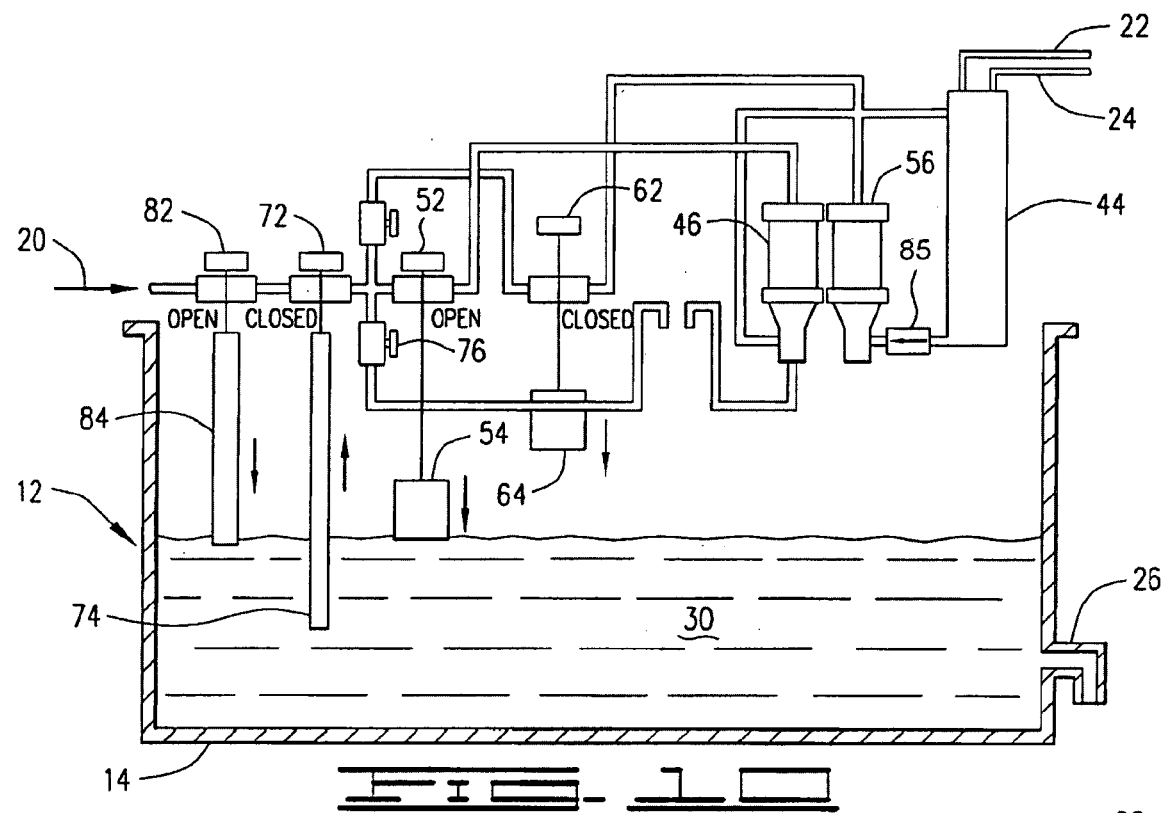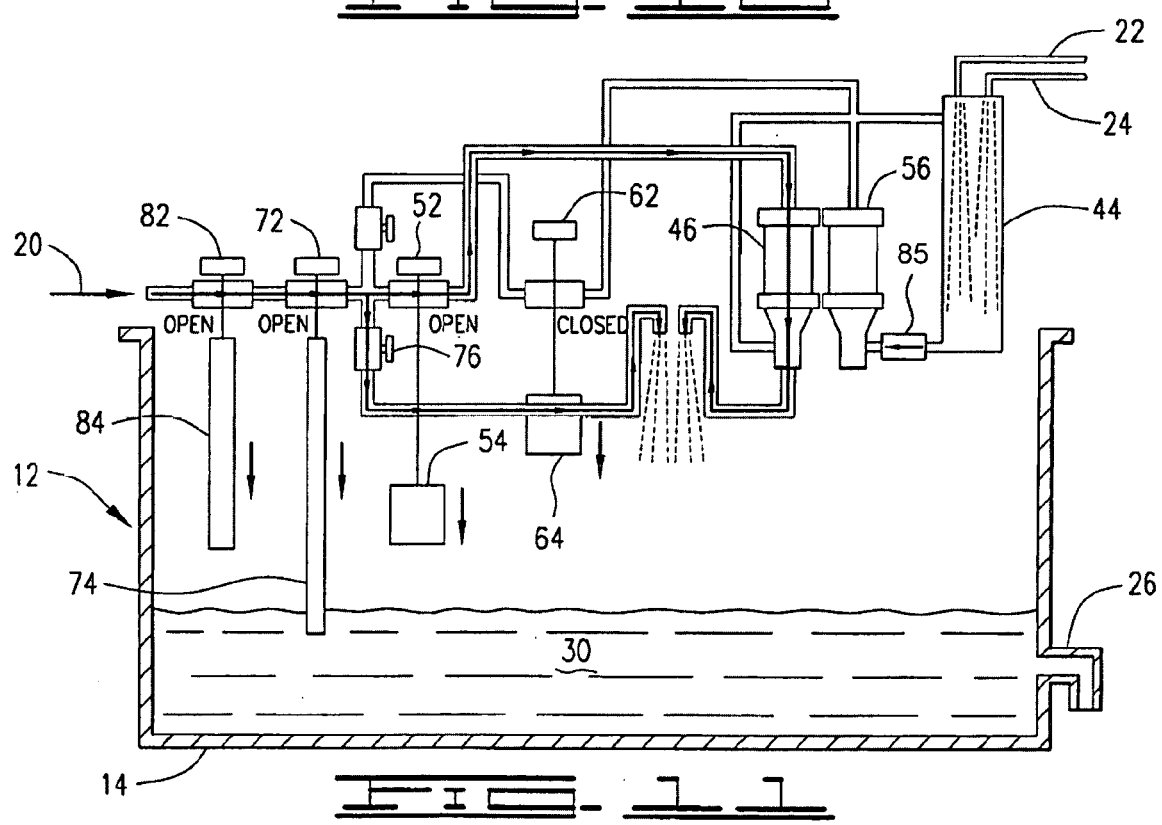

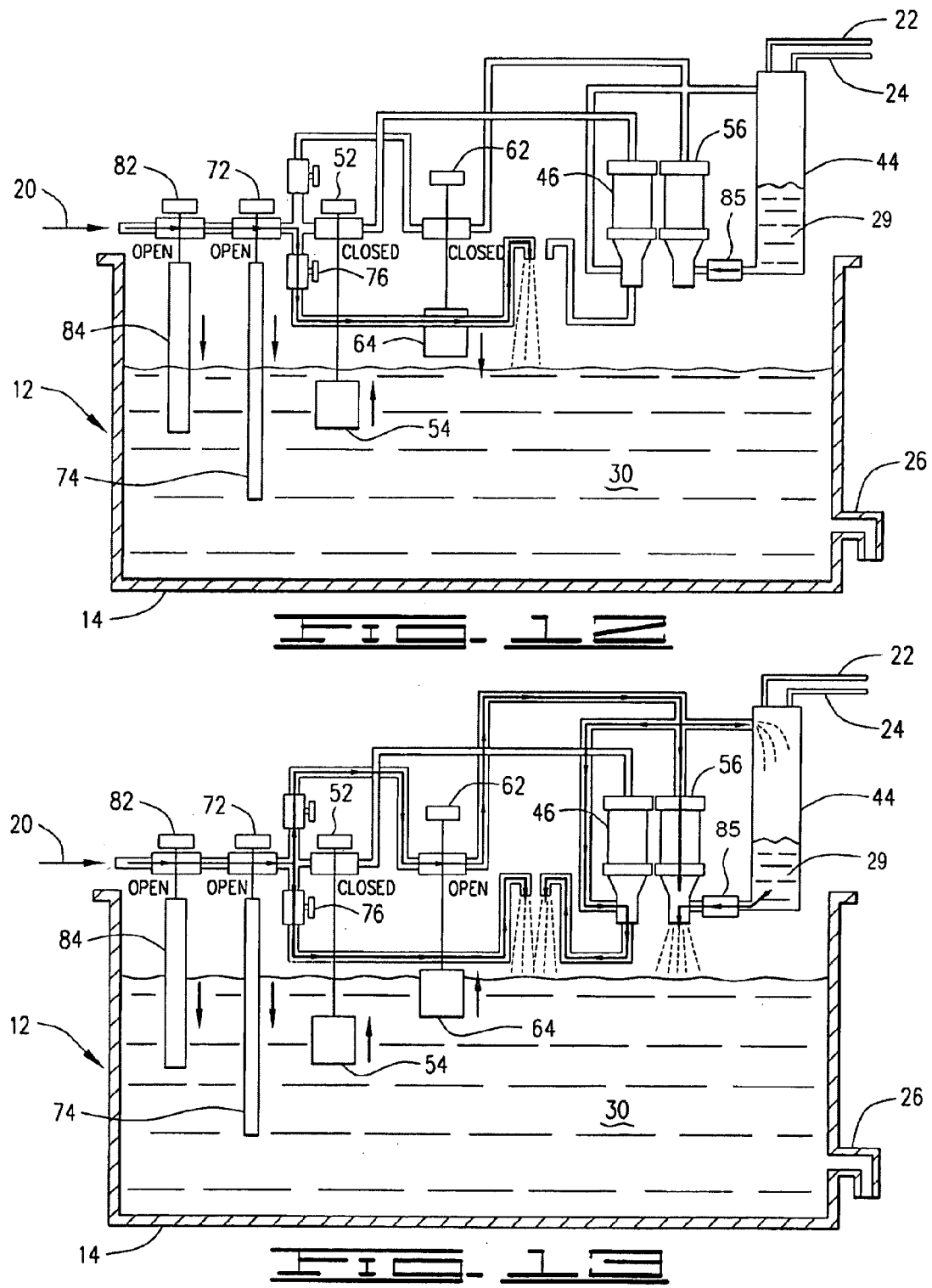

CHEMICAL GENERATOR USING HYDRO-LOGIC SYSTEM

RELATED APPLICATION

This application claims priority to U.S. Provisional Application No. 60/187,898, filed Mar. 8, 2000.

FIELD OF THE INVENTION

The present invention relates generally to the field of chemical generation, and more particularly but not by way of limitation, to the generation of chemicals such as chlorine dioxide using hydrologic systems.

BACKGROUND OF INVENTION

Chemical generation systems and methods often involve complex equipment and abundant energy sources to produce the quantity, quality and concentration of the chemical. Such generators are often expensive and bulky so that the end-user must rely on a commercial generation source to produce the chemical needed which involves both transportation and storage costs and concerns. In the case of sensitive chemicals, such as chlorine dioxide, commercial generation is not usually an acceptable solution for consumers. Chlorine dioxide is a widely used sanitizer in a number of fields such as food processing and water treatment. Some recent approvals by the Food and Drug Administration have made chlorine dioxide a popular choice for sanitizing fruits, vegetables, and seafood. Since chlorine dioxide gas is explosive in nature and cannot be safely transported, it should be generated on-site.

A common method for the generation of chlorine dioxide is the acidification of chlorite or chlorate salts. In food related uses, chlorite salts prevail because of their ability to break down into non toxic by-products. Among acids, any food grade acid, including phosphoric, hydrochloric or citric acid, can be used for this purpose.

Chlorine dioxide generation is most efficient when the precursors are mixed as concentrates. The optimum pH for the reaction is between 2 and 3. At pH values higher than 3, the reaction is not very efficient. On the other hand, at pH values lower than 2, unwanted by-products may be formed. Typically, a 1 to 5 percent chlorite solution is mixed with a selected acid to generate chlorine dioxide. Mixing of the acid with the precursor (chlorite or chlorate) ion is referred as "activation." The time between mixing of the precursors and dilution of the activated mixture is known as the "activation time." To achieve good efficiency of chlorine dioxide generation, 1 to 10 minutes of activation time is usually recommended. This is the time that must lapse before the concentrate is diluted to the target usage concentration. For most sanitary and odor removal applications, the usage concentration typically falls between 1 to 600 ppm of activated product so the product is usually diluted to a concentration within this range. As an alternative to dilution, the concentrate can be metered directly into a flowing water stream; or a batch of concentrate can be dumped directly into a larger water system, such as a vegetable flume, a water storage vessel or a cooling tower, to attain and maintain the proper level of chlorine dioxide concentration.

Mixing of precursors for the production of chlorine dioxide can be accomplished using automated systems. There are several commercial companies that manufacture acid/sodium chlorite generators, such as Belazon Incorporated and Alldos Corporation. However, all commercially available generators known to the marketplace are electrically powered, and all such commercially available generators utilize high cost electronic control logic.

There is a need for a chemical generator that is non-electric, can be installed to operate in remote locations where electrical power is unavailable, can store a reasonable supply of the generated chemical, and is inexpensive to manufacture and maintain.

SUMMARY OF THE INVENTION

The present invention provides a chemical generator having inlets for receiving multiple reactant and water streams; a dilution vessel; a reaction chamber operably connected to the inlets and to the dilution vessel; and an eductor operably receiving the water stream from the one of the inlets and communicating with the reaction chamber for drawing first and second reactant streams into the reaction chamber for mixing. Float control valves are provided for interrupting the water stream to the eductor when desired amounts of the first and second reactant streams have entered the reaction chamber, with a second eductor drawing the mixture of first and second reactant streams from the reaction chamber into the dilution vessel. The float control valves also limit the time the first and second reactants reside in the reaction chamber and interrupt flow of the water stream into the dilution vessel.

The chemical generator is operated in the following sequence: i) first and second chemicals are selectively educed into the reaction chamber; ii) the first and second chemicals are permitted to react for a pre-set time to produce the required product concentration; iii) the generated product is transferred into the dilution vessel; and iv) the generated product is diluted to a pre-set concentration. The chemical generator is particularly suited to generate a chlorine dioxide solution at ready-to-use concentrations of between about 1 to 600 ppm in a safe manner.

BRIEF DESCRIPTION OF THE DRAWINGS

FIG. 3 is a top plan view of a chemical generator platform constructed in accordance with the present invention and adapted to cooperate with the generator vessel of FIG. 1.

FIG. 8 is a schematic of the chemical generator of FIG. 1 depicting one step in the generation of chlorine dioxide.

FIG. 9 is a similar schematic to that of FIG. 8 depicting the next step in the generation of chlorine dioxide.

FIG. 10 is a similar schematic to that of FIG. 9 depicting the next step in the generation of chlorine dioxide.

FIG. 11 is a similar schematic to that of FIG. 10 depicting the next step in the generation of chlorine dioxide.

FIG. 12 is a similar schematic to that of FIG. 11 depicting the next step in the generation of chlorine dioxide.

FIG. 13 is a similar schematic to that of FIG. 12 depicting the next step in the generation of chlorine dioxide.

DETAILED DESCRIPTION OF THE INVENTION

Figure 1:
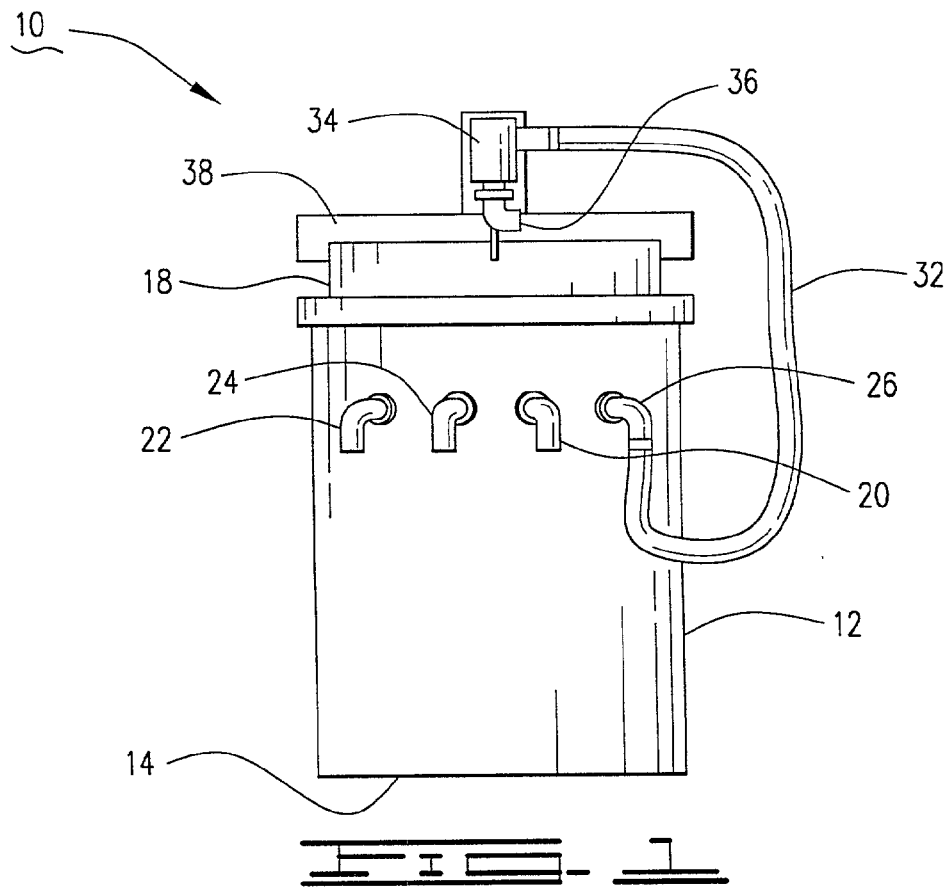
FIG. 1 is a side view of a chemical generator vessel that is constructed in accordance with the present invention.

Referring to the drawings in general and particularly to FIG. 1, shown therein is a chemical generator vessel 10 constructed in accordance with the present invention. While the present invention will be described in relation to the embodiment shown in the appended drawings, the applicants do not consider their invention to be limited to that shown, and it will be understood that the present invention can be adapted to other embodiments.

The chemical generator 10 has an open top cylindrical dilution vessel 12 with a bottom 14 and is constructed of a material suitable to contain the activated solution that is generated therein. Typically, the chemical generator 10 preferably will be a tank of about 7 gallons, an amount which will usually maintain a proper depth for operation of logic function floats and other components described hereinbelow. Of course, the dimensions and capacity can be adjusted as required for a particular installation.

The chemical generator 10 serves several purposes, including: holding the activated solution; serving as a dilution vessel; and providing mounting surfaces for the components of the chlorine dioxide generation system. The latter mentioned feature is most useful as the mounting of valves and plumbing on the chemical generator 10 is particularly economically advantageous. As will be clear hereinbelow, the height dimension of the chemical generator 10 is determined such that an adequate water level is maintained for proper float functioning. It will also become clear herein that, since the operational liquids only contact non-moving parts, all critical contact areas can be made of a highly chemical resistant plastic such as PVC, CPVC, PVDF, Kynar®, Teflon®, Carilon® or of a highly resistant metal such as some types of stainless and titanium alloys.

Figure 2:
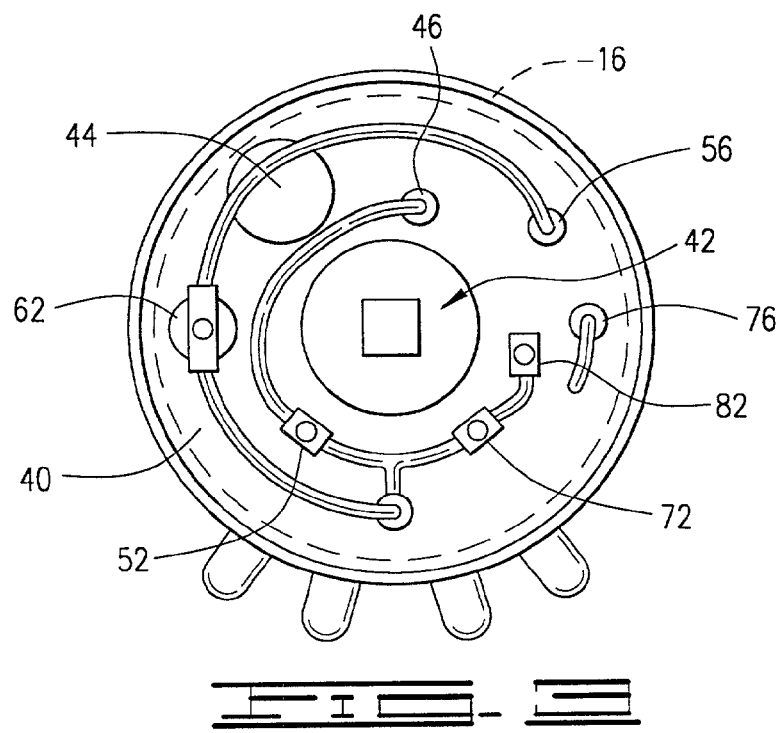
FIG. 2 is an exploded, perspective view of the generator vessel of FIG. 1.
Figure 2:
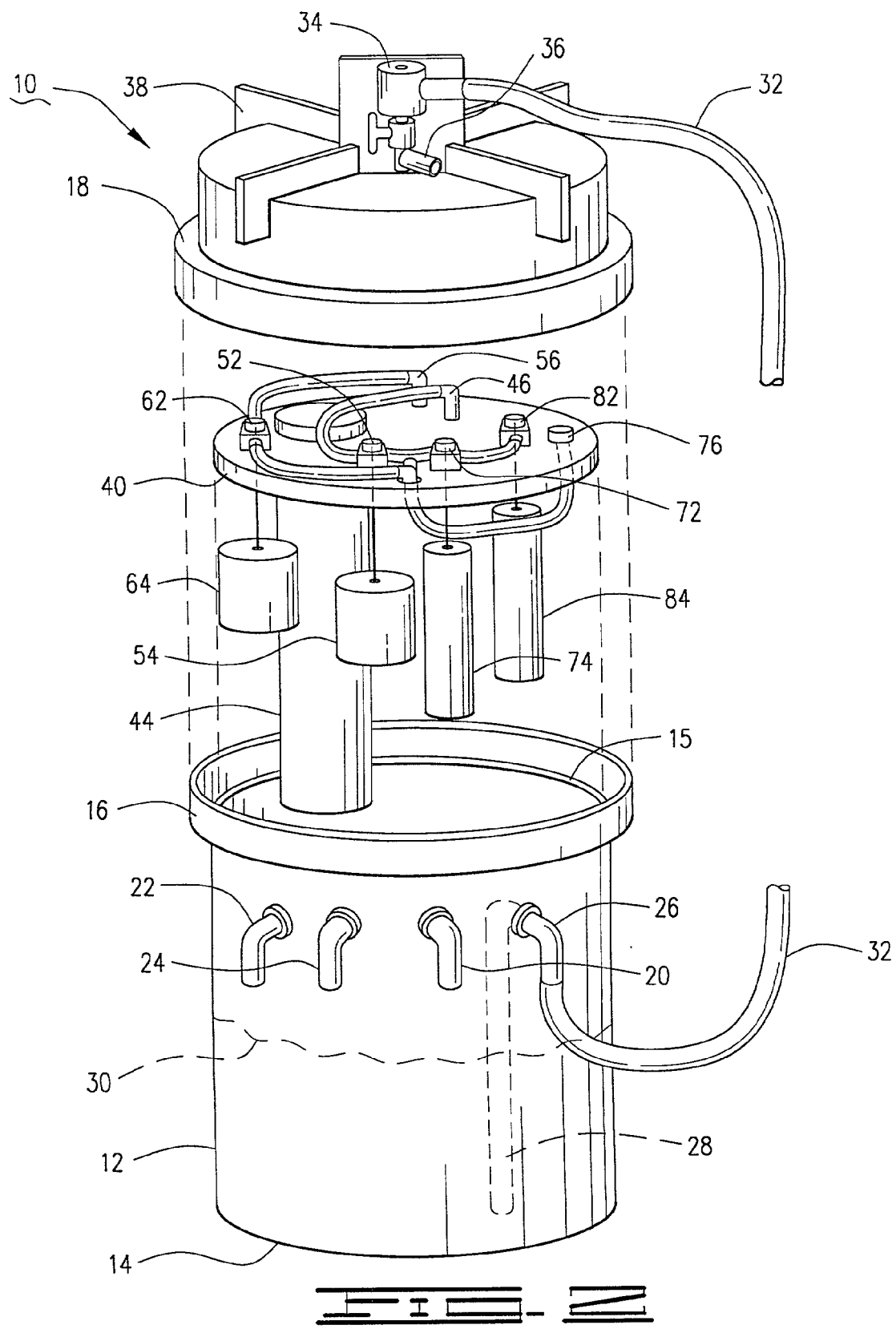

The chemical generator 10 has a cylindrical lip 15 supported at the top of the cylindrical vessel 12 that forms a support shoulder 16 as shown in FIG. 2. A lid member 18 is dimensioned to fit over the support shoulder 16. The chemical generator 10 has a water or diluent inlet 20 to receive water via an appropriate conduit (not shown) from a local water source, such as a municipal water supply that is typically pressurized at about from 25 to 80 psig. Of course, the inlet pressure can be established at any desirable value by pressure reducing or pressure elevating pumps (not shown) as may be necessary. Preferably, an inlet water pressure of between 30 to 50 psi will be available for optimum and safe generation. The motive force of water delivered to the water inlet 20 operates the floats, valves, eductors and needle valves described hereinbelow.

The chemical generator 10 has a first inlet 22 with an orifice to receive a first reactant stream for a first reactant source and a second inlet 24 with an orifice to receive a second reactant stream for a second reactant source. The chemical generator 10 also has an outlet 26 to which is connected a product tube 28 disposed within the chemical generator 10 and which extends below the level of a resultant reactant product 30 produced by the present invention. The outlet 26 via the product tube 28 provides for the removal of the resultant reactant product 30 from the bottom of the chemical generator 10 via the product tube 28 that has its proximal end positioned near the bottom 14.

The outlet 26 is connected via a product conduit 32 to a user valve 34 to which is connected a user outlet 36, both the user valve 34 and the user outlet 36 supported by support ribs 38 which extend upwardly from the lid 18. A support portion of the support ribs 38 serves as a support plate to which the user valve 34 is attached via an attaching member not separately designated.

A cylindrically shaped equipment platform 40, shown in FIG. 3, is dimensioned for support on the cylindrical lip 15 of the chemical generator 10. The equipment platform 40 has a central opening 42, for access, and a cylindrically shaped reaction chamber 44 extends through, and is supported in, another opening in the equipment platform 40. The reaction chamber 44 is a vacuum tight chamber that acts as a container for receiving the first and second reactants and retaining the reactants for a determined reaction time.

Figures 4, 5:
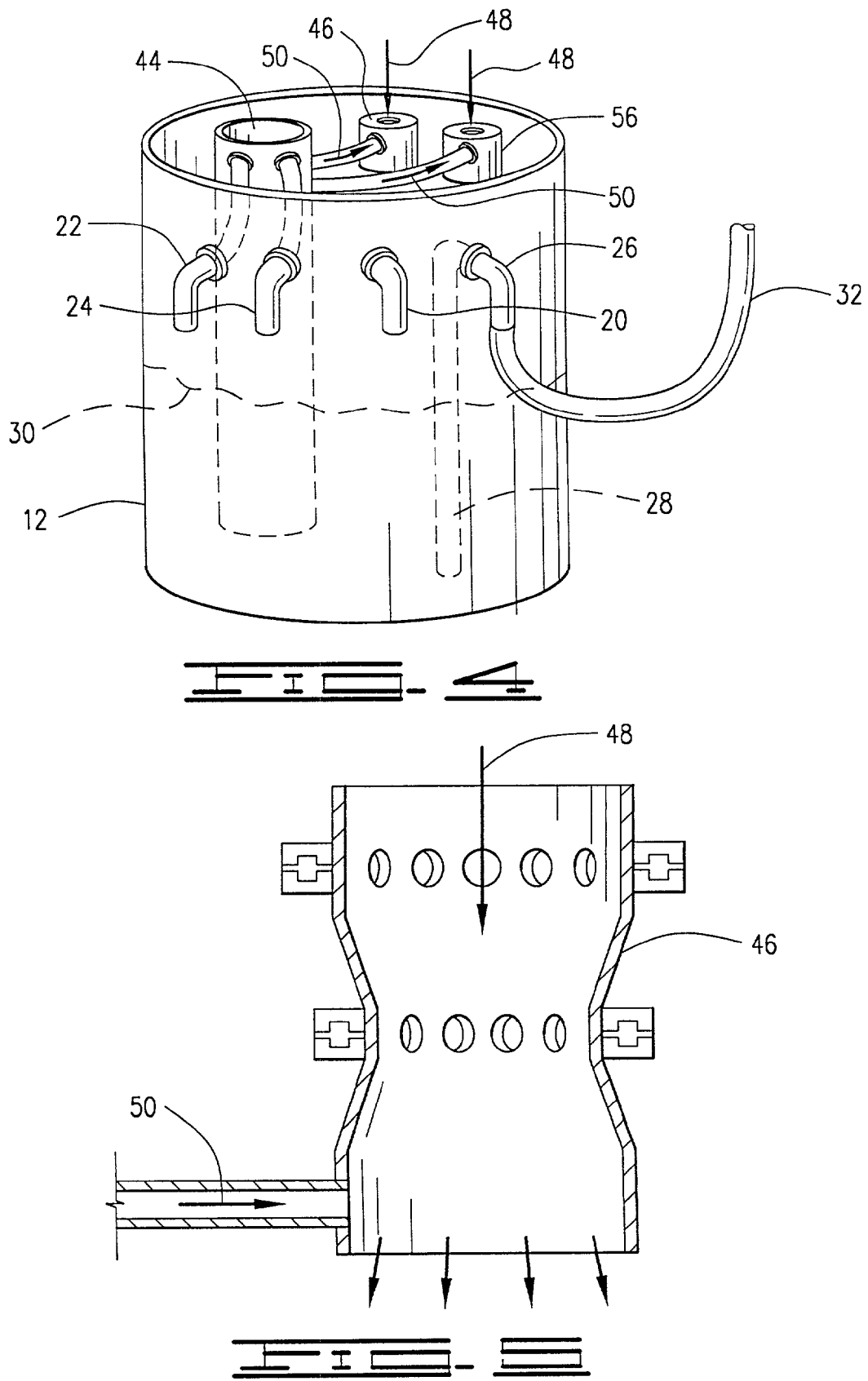
FIG. 4 is a perspective view of the chemical generator vessel of FIG. 1, showing the reaction chamber, eductors and reactant sources without the chemical generator platform of FIG. 2.
FIG. 5 is a cross-sectional view of one of the eductors of FIG. 4.

The equipment platform 40 has a first eductor 46, shown in FIG. 4, which allows fluid to flow through the eductor in the direction indicated by arrow 48. Fluid passing through the first eductor 46, as shown in FIG. 5, causes a pressure differential to develop. The pressure differential causes fluid to move in an attached conduit in the direction of arrow 50. In fluid communication with the first eductor 46, as shown in FIG. 2, is a first valve 52. The first valve 52 is known as a normally closed valve. The valve can be a magnetically coupled, mechanically actuated valve, such as the Dema AquaMaster™ series manufactured by Dema Engineering Company (10020 Big Bend Blvd. St. Louis, Mo. 63122) which have flow ratings of 0.5 to 6 gallons per minute at 40 psi. or a similar mechanically float-actuated valve by Hydro® Systems (3798 Round Bottom Road, Cincinnati, Ohio 45244) which have valves with flow rates from 4.5 to 44 gallons per minute. If a magnet is used, the magnet is attached to a moving device that actuates the opening and closing of the valve. The magnetic field that is produced as a result of the magnet movement, positions the valve pilot armature in an on or off position. Therefore, various float parameters such as the shape, size and density, as well as the unique plumbing features are the determining factors involved in the construction of these units. Toilet tank valves and water tank fill valves can also be adapted to perform the required functions. Generally, the first valve 52 operates by an up and down movement which is well understood by those skilled in the art.

Attached to the first valve 52 is a first float 54 shown in FIG. 2. The first float 54 is specially built to trip the first valve 52 at a specific water level and is a short, medium to large (1.2" to 6" diameter) diameter float. The first float 54 is of sufficient weight that when the fluid level is low the first valve 52 trips to an open condition and when the fluid level is high the first valve 52 trips to an closed condition. The relationship between the first float 54 and the first valve 52 is such that the valve will go from a closed to an open position when the fluid level drops in the dilution vessel or chamber 12 is equal to the amount of fluid that is displaced by the first float 54, for example, an 8.86 cm diameter float displaces 56.0 grams of water per cm of float length. In order to get the 368 grams of float weight needed to trip the first valve 52, the first float 54 has to be out of the water 6.5 cm beyond neutral buoyancy. The first float 54 is made slightly heavier than a 1.0 density so that the first float 54 will not float on the surface of the product 30. The first float 54 is also made somewhat heavier and longer than theory to accommodate variations in the valve springs and take advantage of the valve spring hysteresis phenomenon. The actual first float 54 used measured 8.86 cm in diameter by 11.3 cm in length weighing 724 grams for a density of 1.06. This configuration allows for 75 grams of downward pull and the first float 54 remains submerged.

Figure 6:
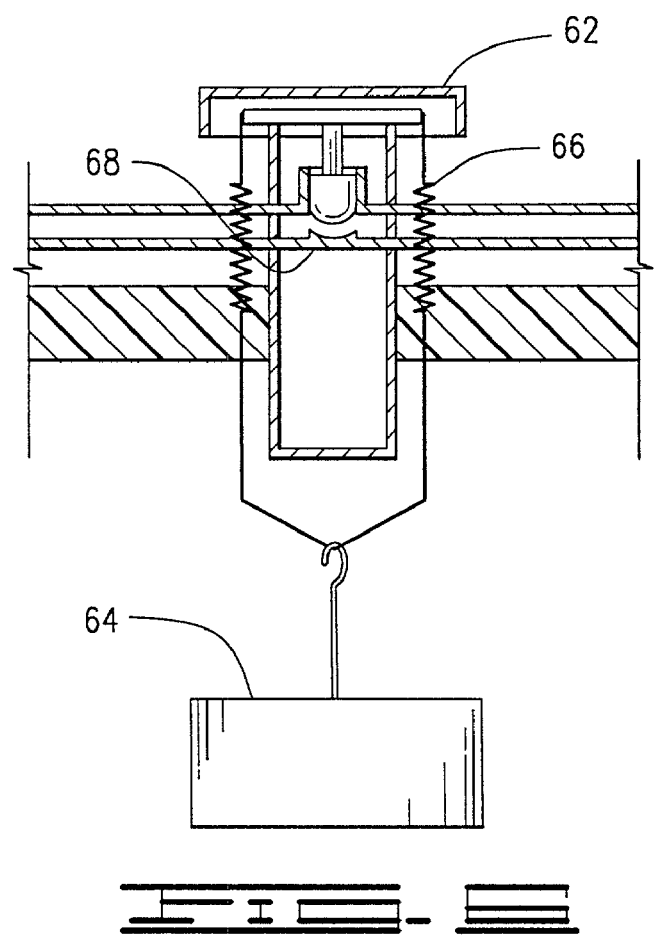
FIG. 6 is a cross-sectional view of one of the valves and attached floats of the chemical generator of FIG. 2.

The equipment platform 40 also has a second eductor 56, shown in FIG. 2. The second eductor 56 acts like the first eductor 46 discussed above and is in fluid communication with the second valve 62. The second valve 62 is placed in an upside down position to facilitate a normally open instead of a normally closed function that is used for the first valve 52, and all other valves of the present invention. No normally open float actuated valve is commercially available at this time so a normally closed valve such as the Dema Aquamaster™, is turned upside down so that the valve becomes a normally open valve. The second valve 62 is connected to a second float 64 which is a short (4" to 6") and wide (4" to 6") float and has similar dimensions to the first float 54. The second valve 62 is open when the fluid level is high and closed when the fluid level is low. FIG. 6 shows the second float 64 attached to the second valve 62. The second valve 62 has a spring hanger 66 and a valve seat 68. When the second float 64 moves up or down, the float activates the spring hanger 66 which in turn seats or unseats the valve from the valve seat 68, allowing fluid flow past the second valve 62 or stopping any flow past the second valve 62.

The configuration of the second float 64 in relationship to the second valve 62 and spring hanger 66 can be altered even further by increasing the density of the second float 64 within the confines of about 100 grams (approximately 2 cm on a 8.86 cm diameter float) of spring tension that is supplied by the spring before the valve switches to off. This is done in order overcome the added resistance of the reverse second valve 62. In other words the weight to turn the second valve 62 on is 368 grams and the reverse cycle to turn the second valve 62 off is only 250 grams. The float can be made at a slightly higher density to always exert downward pressure of up to 175 grams when submerged. This allows for fine tuning of the float for the lowest cm of exposed float needed to actuate the valve to the on position. The above configuration has a density of about 1.13 which gives an extra 75 grams (1.34 cm shorter) of downward pull while the float is submerged, which in turn shortens the amount of exposed float needed to reach the critical 368 grams to 5.2 cm.

The equipment platform 40 shown in FIG. 2 shows a third valve 72 connected to a third float 74. The third float 74 is long, with a small diameter (0.5 to 2.0"). The third float 74 is long and slim so that the third valve 72 will not turn on until the tank is at its lowest level of product in the logic cycle or turn off until the fluid level in the dilution chamber 12 is at the highest level, the level designed to be lower than an overflow fluid cutoff level. The third valve 72 stays open longer than would be anticipated based on the buoyancy of the third float 74 because the third valve 72 is set by a spring or magnet to have a delayed closing. The third valve 72 operates like the first valve 52 discussed above and is in fluid communication with a timing needle valve 76. The timing needle valve 76, shown in FIG. 7, consists of a needle 80 with an adjustable threaded portion 78 that controls placement of the needle 80 in a flow-line. The adjustable threaded portion 78 in the timing needle valve 76 allows for adjustment of the delay-time (subsequent activation of the reactants in reaction chamber 44) activation for the second valve 62 and on through the second eductor 56.

The equipment platform 40 shown in FIG. 2 shows a fourth valve 82 connected to a fourth float 84. The fourth float 84 has different dimensions then the first float 54, the second float 64 and the third float 74 which allows the fourth valve 84 to operate open at a wider range of conditions (for example the ability to be open at the lowest operating fluid level and also at a highest operating fluid level but closed at a predetermined overflow level). The fourth valve 82 operates like the first and third valves 52, 72 discussed above and is in fluid communication with the first three valves 52, 62, and 72.

All the floats discussed above actuate the mechanical valves at the predetermined water levels as demanded by the sequence of events during the process. The combination of the mechanical valves and the various float diameters, lengths, sizes, densities and shapes facilitate the control logic functions required to operate the generator, coupled with proper routing of water sequencing as needed to properly operate the water actuated chemical generator. The floats utilized with, the Dema 440 valve discussed above, are specially built to trip the valves at different fluid levels. Each float is of sufficient weight (submerged) when the fluid level is low to trip the valve to an open or closed condition (depending on the valve). For example, the Dema 440 valve actuates from a closed position to an open position with a downward pull of approximately 370±10 grams. The crucial design feature of the float described above displaces only 5.2 cm instead of 6.5 cm of its length before the 368 gram trip point is reached.

Floats for the chemical generator 10 are made to the following criteria to fit a tank of only 15 inches in height. Larger tank sizes or finished product concentration needs will require floats of different diameter, length and weight to control the logic functions.

The float dimensions used in this are given in the following table:

| Float # | Diameter (cm) | Length (cm) | Weight (g) | Volume (cc) | Density (g/cc) | Wgt. (g) | Exposed* Length (cm) |
|---|---|---|---|---|---|---|---|
| 1 | 8.86 | 11.3 | 724 | 684 | 1.06 | 40 | 6.5 |
| 2 | 8.86 | 11.3 | 724 | 684 | 1.06 | 40 | 6.5 |
| 3 | 4.23 | 34.0 | 606 | 476 | 1.27 | 130 | 26.5 |
| 4 | 4.84 | 32.0 | 754 | 588 | 1.28 | 166 | 21.5 |

*Length of weight exposed at 368 g trip point

Figure 14B:
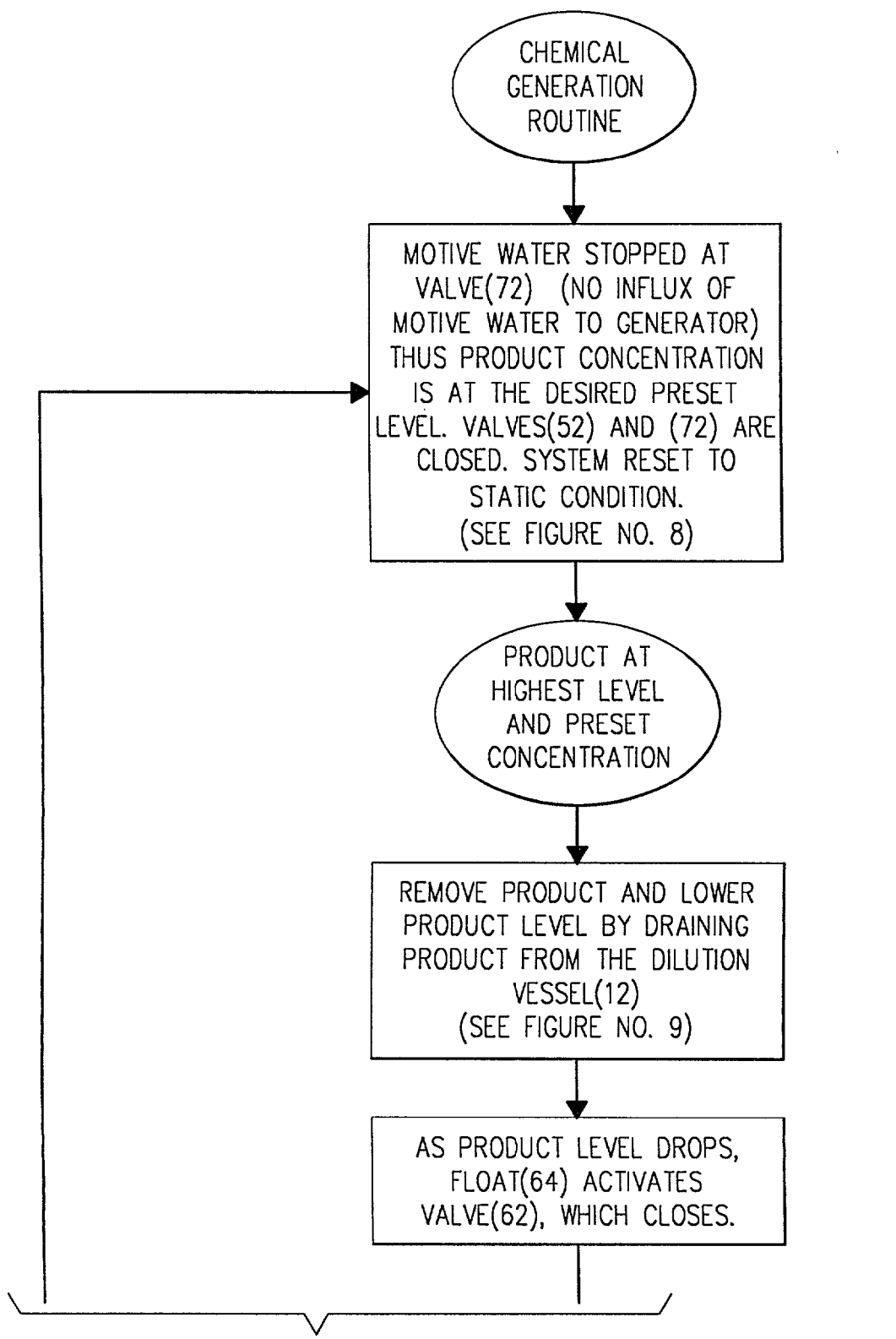
FIG. 14 is a diagrammatical flow chart of the sequence of operation of the chemical generator depicted in FIGS. 8–13.
Figure 14B:
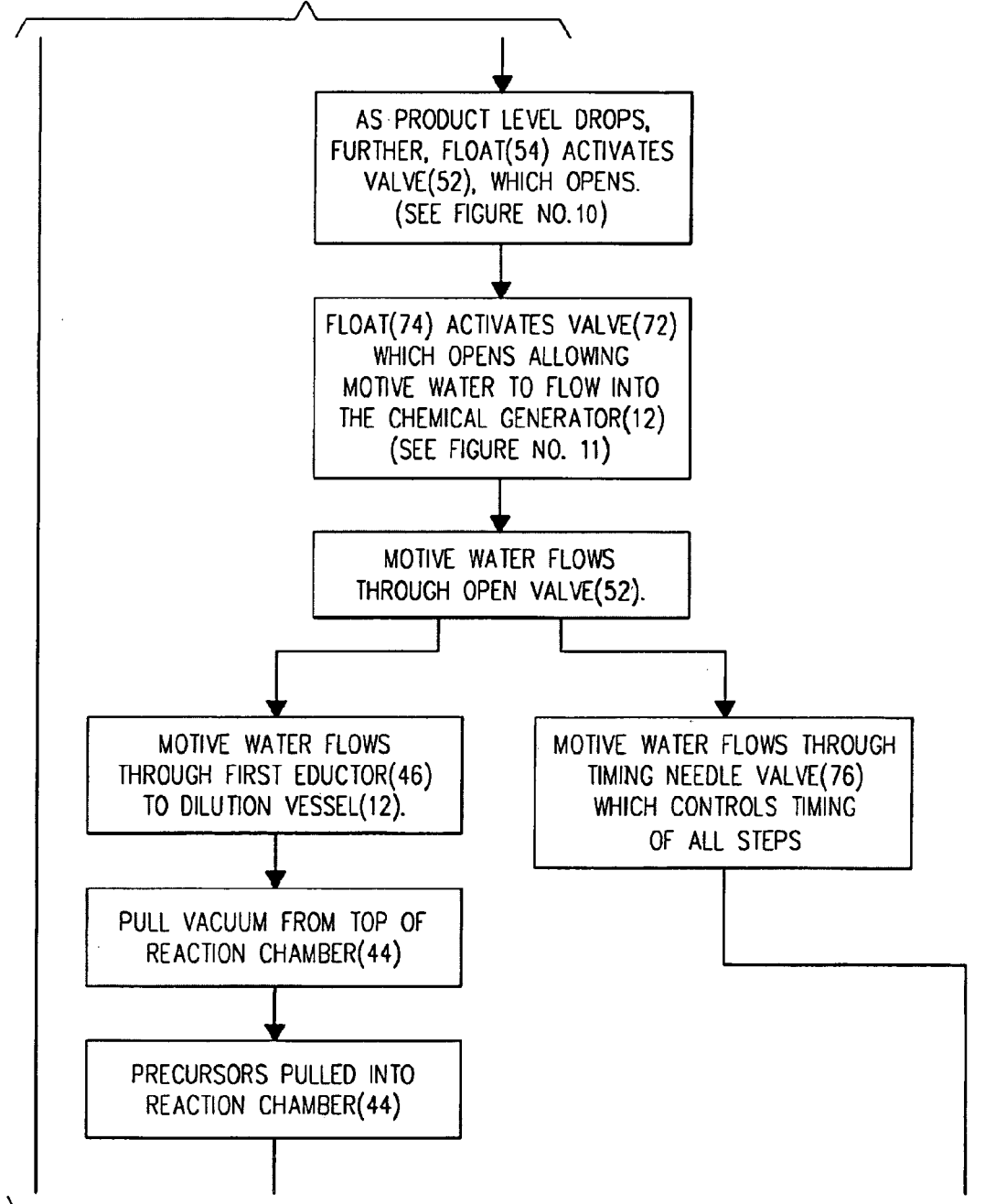
Figure 14B:
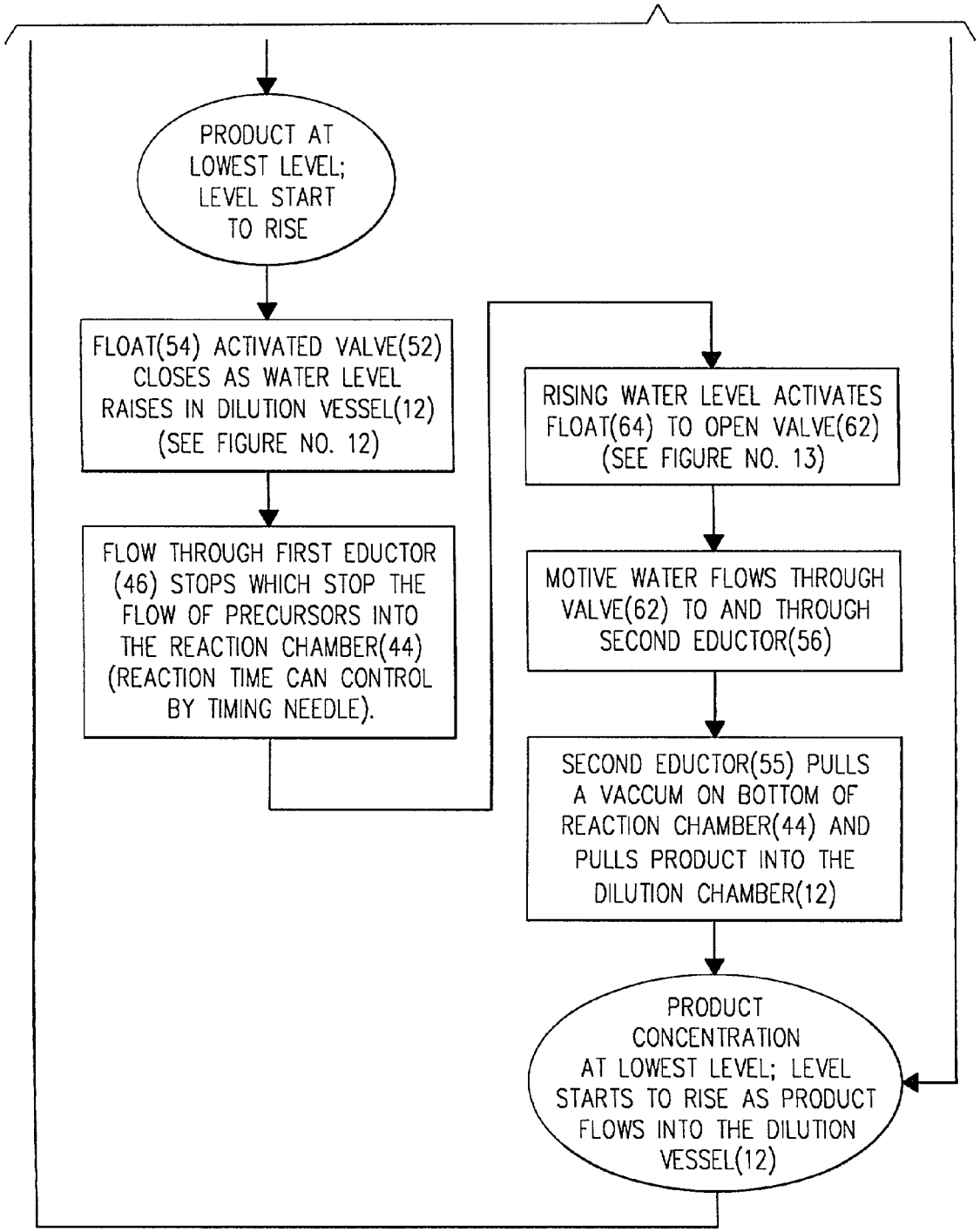

The operation of the chemical generator 10 will be described with reference to FIGS. 8 through 13, each of which depicts a step in the generation of chlorine dioxide, and with reference to FIG. 14 which is a flow chart of these steps. It should be noted that, in general, chlorine dioxide generation is most efficient when the precursors are mixed as concentrates, and the optimum pH for the reaction is between 2 and 3. At pH values higher than 3, the reaction is not very efficient. On the other hand, at pH values lower than 2, unwanted by-products may be formed.

A GRAS acid, an acid that is "generally regarded as safe" as defined in the CFR, is mixed with the precursor (chlorite or chlorate ions in a 1 to 5% solution) in what is referred as "activation" to form an activated solution 29. The time between mixing of the precursors and dilution of the activated solution 29 is known as the "activation time."

To achieve good efficiency of chlorine dioxide generation, 5 to 10 minutes of activation time is usually recommended. This is the time that must lapse before the concentrate is diluted to the target usage concentration. For most sanitary and odor removal applications, the usage concentration typically falls between 1 to 600 ppm of activated product so the product is usually diluted to a concentration within this range.

The counter cations for the chlorite and chlorate ions include, but are not limited to sodium, potassium, calcium, magnesium and transition metal ion. The preferred concentration, 1 to 5% solution of sodium chlorite, can be used in combination with one of the following acids: hydrochloric, phosphoric, citric, acetic, sulfuric, perchloric, or nitric. The concentration of the acid is dependent on the initial concentration of the chlorite ion and the activation level required. Any combination of reactants that produce chlorine dioxide can be used, for example, with a 2% sodium chlorite solution typically 75% phosphoric or 33% hydrochloric acid can be used. Another combination is a first reactant of 40% sodium chlorate and 10% hydrogen peroxide and a second reactant of 78% sulfuric acid. The concentration and activation levels of the finished product can be altered by changing the intake orifice 22, 24 sizes, precursor chemical concentrations and types, as well as the first and second eductor 46, 56 size and the flow volume through the needle valve 76, as will be discussed below.

When the product 30 in the chemical generator 10 drops to a level that the first float 54 activates the first valve 52 then water flows through the first eductor 46. When water flows through the first eductor 46 in the direction shown by arrow 48, as shown in both FIG. 4 and FIG. 5, then the first eductor 46 creates a flow, as indicated by the arrow 50, of air from the reaction chamber 44. As air is evacuated from the reaction chamber 44, a vacuum develops in the vacuum tight reaction chamber 44. The vacuum created in the reaction chamber 44 draws reactants from inlet orifices 22 and 24 that are connected to the sodium chlorite and the acid containers. The reaction chamber 44 provides the protected environment needed for activation before the activated solution 29 is expelled. As shown in FIG. 12, when the first valve 52 closes, water ceases to flow through the first eductor 46. The design of the first eductor 46 used is such that the first eductor 46 allows the venting of any pressure that may be generated from the reaction of the precursors.

The combination of the float size, density and length of the float for the first valve 52 coupled with the water flow volume through the first eductor 46, and the eductor's efficiency, controls the vacuum on the first and second inlet orifices 22, 24 that are individually sized to pass, under vacuum, the proper amounts of precursors (sodium chlorite and acid) into the reaction chamber 44. The volumes of chlorite and acid educted into the reaction chamber 44 and the total volume of water used by the logic functions determines the final product's concentration in the dilution chamber 12.

As the level continues to rise, the second float 64 activates the second valve 62 that is coupled to the second eductor 56, as shown in FIG. 13. The second valve 62 is placed in an upside down position, as discussed above, to facilitate a normally open instead of a normally closed function. When the second valve 62 is actuated by a rising fluid level, the activated solution 29, which is a chlorine dioxide solution, is pulled from the bottom of the reaction chamber 44 as water flows through the second valve 62. The activated solution 29 is diluted in the dilution chamber 12. When the second float 64 falls with the falling product 30 level, the second float 64 will pull tension on spring hanger 66 so the valve will seat in the valve seat 68. This stops the water flow in the flow-line between the second valve 62 and the second eductor 56.

As shown in FIG. 2, a third float 74 controls a third valve 72. The length, density, and diameter of the third float 74 adjusts the fill height required to actuate the function of the third valve 72. The third float 74 controls the water stream that will be utilized by a timing needle valve 76 in conjunction with the first and second valves 52, 62 in preparing the activated solution 29 and in the further dilution of the activated solution 29 in the dilution chamber 12. The third float 74 is long and slim and will not turn on third valve 72 until the fluid level in the dilution chamber 12 is at its lowest level or turn off third valve 72 until the fluid level in the dilution chamber 12 is at the highest level, the level designed to be lower than a overflow fluid cutoff level. The third valve 72 stays open longer then would be anticipated based on its buoyancy because the third valve 72 is set by a spring or magnet to have a delayed closing. This is an example of another way the hydrologic system of the chemical generator 10 can be adjusted to control the steps necessary to achieve the desired final product.

Figure 7:
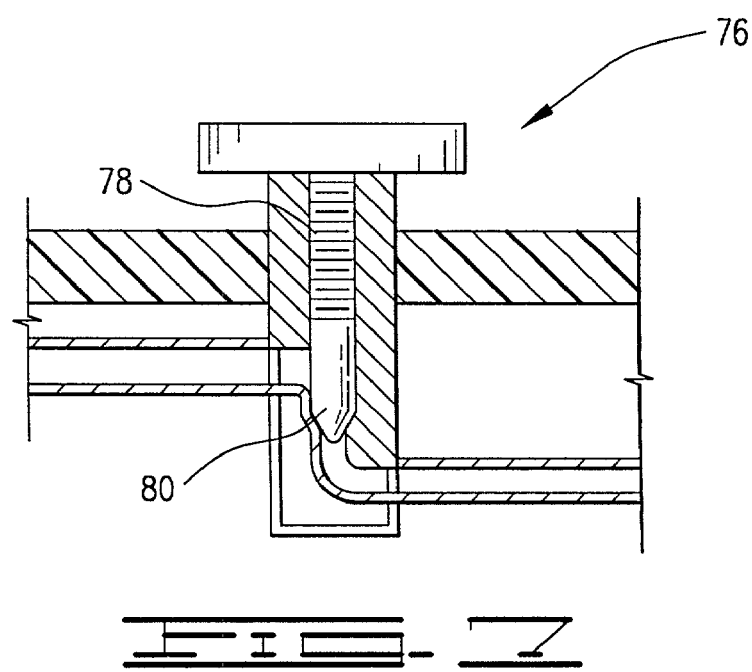
FIG. 7 is a cross-sectional view of the needle valve of the chemical generator of FIG. 2.

The timing needle valve 76, as shown in FIG. 7, continues to fill the dilution chamber 12 during and after the first eductor's 46 precursor eduction is complete and the first valve 52 is closed. The motive water ceases to flow through the first eductor 46, but continues to flow through the timing needle valve 76. The regulated flow through the timing needle valve 76 controls the time that the combination sodium chlorite and acid are allow to react in the reaction chamber 44. The time period can be adjusted by changing the tension on an adjustable threaded portion 78 of needle 80 that controls placement of the needle 80 in the flow-line from the water inlet 20. The timing needle valve 76 allows for proper reaction time for the reactants in the reaction chamber 44 before the flow from the timing needle valve 76 raises the level in the dilution chamber 12 to the point that the second float 64 activates the second valve 62.

As discussed above, the water from the second valve 62 provides motive for the second eductor 56. The vacuum created by water flow through the second eductor 56 pulls the activated solution 29 from the reaction chamber 44 and dilutes the activated solution 29 with the motive water and discharges the resulting solution into the dilution chamber 12. Water continues to flow through the timing needle valve 76 and the second eductor 56 until the third float 74 actuates the third valve 72 returning the system to a static state.

As shown in FIG. 2, a fourth float 84 controls a fourth valve 82 to provide overflow protection for the system. If the system starts to overflow, the fourth valve 82 shuts off all water flow to the system. The fourth valve 82 is on at all times unless an accidental overflow condition is present. The fourth float 84 for the fourth valve 82 is set high in the dilution chamber 12, and the high level position of the fourth float 84 prevents interference with other valves that are involved in the production cycle of the generator system. The fourth valve 82 is not involved in any of the logic functions needed to generate the resultant reactant product 30. The fourth valve 82 can be equipped with a safety interlock mechanism that keeps the fourth valve 82 from refilling the dilution chamber 12 until the fourth valve 82 is manually reset. This unit can produce up to about 5 pounds of chlorine dioxide in a 24 hour period. Through the use of an adjuster on the user valve 34, the user outlet 36 can generate a stream, a spray, or a mist of resultant product 30. The user outlet 36 can be attached to a separate structure 38 which is fitted to the lid 18 of the chemical generator 10.

The method of the present invention will now be described with relation to FIGS. 8 through 14 which are flow diagrams of describing the steps involved in the generation of a chemical such as chlorine dioxide. The chemical generation process will be described from the time the motive water is stopped at valve 72, as depicted in FIG. 8. This means that the water level in the dilution chamber 12 is high which would not be the case if there was no product in the dilution chamber 12, say at the beginning of the process. If that was the case, those skilled in the art would know ways to get the process started, such as filling the dilution chamber 12 with water or resetting the valves. In FIG. 8, there is no influx of motive water to the chemical generator 10 thus product concentration is at a preset level. During this step valves 52, and 72 are closed and the system is reset to a static condition.

When product 30 is removed from the dilution chamber 12, as shown in FIG. 9, the product 30 level starts to drop in the dilution chamber 12. As the product 30 level drops, float 64 activates valve 62, which closes. Then, as depicted in FIG. 10, float 54 activates valve 52, which in turn opens.

Finally, as the product level 30 drops even more, as depicted in FIG. 11, float 74 activates valve 72 which opens and allows the motive water to flow into the chemical generator (10).

As FIG. 11 shows, once the motive water flows into the chemical generator 10 through first valve 52, the motive water flows on to the first eductor 46 and on to the dilution chamber 12. As motive water flows through first eductor 46, the motive water pulls a vacuum on the top of the reaction chamber 44. This vacuum in turn pulls the precursors from the first and second inlet orifices 22, 24 into the reaction chamber 44. The water that has flown flowed through the first eductor 46 also causes the water level to rise in the dilution chamber 12. There is a check valve 85 on the reaction chamber that prevents the flow of air into the reaction chamber 44 through second eductor 56 while the first eductor is operational.

As depicted in FIG. 12, first float 54 activates first valve 52 as the water level raises in the dilution chamber 12, causing first valve 52 to close. This causes flow through the first eductor 46 to stop. Thus no more chemical precursors flow into the reaction chamber 44. The timing of all the steps that involve motive water can be adjusted by adjusting the timing needle valve 76 shown in FIGS. 8–13. For example, the amount of chemical flowing into the reaction chamber 44 could be reduced if the timing valve 76 was adjusted to speed up the flow rate through the timing valve 76 and the whole generator 10. In a similar way the activation time can be adjusted, as shown in FIG. 12.

As depicted in FIG. 13, the rising water level activates second float 64 to open second valve 62. Motive water flows through second valve 62 to the second eductor 56. The second eductor 56 pulls a vacuum on the bottom of the reaction chamber 44 and pulls the activated solution 29 into the dilution chamber 12. As explained above, the activation time is related to the fill rate of dilution chamber 12 through the needle valve 76. At this time the product 30 concentration is at the lowest level but that level starts to rise as activated solution 29 flows into the dilution chamber 12.

As the system is drawn down to activate valve third 72 again the cycle outlined above will repeat. The cycle time is dependent on the setting of the timing needle valve 76 that controls the length of time that the reactants will remain in the reaction chamber 44. The time for an entire cycle can be as low as 2 minutes and as long as 30 to 40 minutes. The timing cycle is determined by the concentrations of the reactants that are drawn into the reaction chamber 44 and the amount of chlorine dioxide gas yield from the reactants that is desired. Longer reaction times equate to more chlorine dioxide gas.

It will be clear that the present invention is well adapted to attain the ends and advantages mentioned as well as those inherent therein. While a presently preferred embodiment has been described for purposes of this disclosure, numerous changes may be made which will readily suggest themselves to one skilled in the art and which are encompassed in the spirit of the invention disclosed and as defined in the appended claims.

What is claimed is:

1. A chemical generator for producing chemical solutions from first and second reactants, comprising:
    (a) a first reactant inlet including a rate-controlled orifice;
    (b) a second reactant inlet including a rate-controlled orifice;
    (c) a reaction chamber with an outlet including a check valve, contained within the walls of the diluent chamber, operably connected to the first and second reactant inlets;
    (d) hydrologic controls for hydrologically controlling the flow of the first and second reactants;
    (e) A diluent inlet; and
    (f) a dilution chamber, defined by the walls of the diluent chamber, operably connected to the reaction chamber and the diluent inlet, the hydrologic controls responsive to predetermined fluid levels in the dilution chamber;
    (g) a first eductor operably connected to the diluent inlet and the reaction chamber;
    (h) a first float control valve operably connected and in fluid communication with the first eductor;
    (i) a second eductor operably connected with the dilution inlet and the reaction chamber;
    (j) a second float control valve operably connected and in fluid communication with the second eductor;
    (k) a third float control valve operably connected and in fluid communication with the first and second float control valves;
    (l) a fourth float control valve operably connected and in fluid communication with the third valve; and
    (m) a needle valve operably connected and in fluid communication with each of the first, second and third float control valves.

2. The chemical generator of claim 1 wherein the first reactant is a chlorite salt, the second reactant is a food grade acid and the diluent is water.

3. A method for producing chemical solutions from first and second reactants, comprising:
    (a) passing a first reactant and a second reactant with rate-controlled orifices to a reaction chamber;
    (b) allowing the first and second reactants to react to form an activated solution while being contained by a check valve;
    (c) passing a diluent to a dilution chamber;
    (d) hydrologically controlling the flow of the activated solution from the reaction chamber to the dilution chamber, the hydrologic controls responsive to predetermined fluid levels in the dilution chamber;
    (e) passing the diluent through a first eductor to draw the first and second reactants into the reaction chamber;
    (f) controlling the diluent flow to the first eductor with a first float control valve;
    (g) passing the diluent through a second eductor to draw the activated solution from the reaction chamber into the dilution chamber;
    (h) controlling the diluent flow to the second eductor with a second float control valve;

(i) controlling the flow of the diluent by a third float control valve, responsive to a predetermined fluid level, to the dilution chamber, the first eductor and the second eductor;

(j) terminating the flow of the diluent from the diluent inlet to the diluent chamber by a third float control valve responsive to a predetermined fluid level; and (k) controlling the flow to each of the first, second and third float control valve with diluent passing through a needle valve.

4. The method of claim 3 wherein the first reactant is a chlorite solution, the second reactant is a food grade acid and the diluent is water.

5. The method of claim 3 wherein the first reactant is a combination of sodium chlorate and hydrogen peroxide, the second reactant is sulphuric acid and the diluent is water.

* * * * *